(12) United States Patent
Murphy (10) Patent No.: US 8,992,123 B2
(45) Date of Patent: Mar. 31, 2015

(54) APPARATUS AND METHOD FOR RECOVERING THE CORE OF A SHEATHED ELECTRICAL CABLE

(75) Inventor: Craig Murphy, Bromsgrove (GB)

(73) Assignee: Rook Services Limited, Bromsgrove (GB)

( * ) Notice: Subject to any disclaimer, the term of this patent is extended or adjusted under 35 U.S.C. 154(b) by 77 days.

(21) Appl. No.: 13/642,886

(22) PCT Filed: Apr. 20, 2011

(86) PCT No.: PCT/GB2011/050794
§ 371 (c)(1),
(2), (4) Date: Dec. 19, 2012

(87) PCT Pub. No.: WO2011/131991
PCT Pub. Date: Oct. 27, 2011

(65) Prior Publication Data
US 2013/0209174 A1    Aug. 15, 2013

(30) Foreign Application Priority Data
Apr. 23, 2010  (GB) .................................. 1006815.3

(51) Int. Cl.
*F16L 7/00* (2006.01)
*H01B 15/00* (2006.01)
*H02G 1/08* (2006.01)

(52) U.S. Cl.
CPC ............... *H01B 15/00* (2013.01); *H02G 1/081* (2013.01)
USPC .................. 405/154.1; 405/183.5; 405/184.1; 405/184.4; 254/134.3 R (58) Field of Classification Search
CPC ....................................................... H01R 43/00
USPC ................ 405/154.1, 158, 159, 183.5, 184.1, 405/184.4, 174, 184.3; 254/134.3 FT, 134.4, 254/134.43 R
See application file for complete search history.

(56) References Cited

U.S. PATENT DOCUMENTS

| | | | | |
|---|---|---|---|---|
| 3,799,503 | A | * | 3/1974 | Desplats ........................ 254/384 |
| 4,297,055 | A | * | 10/1981 | Peacock ......................... 405/184 |
| 5,325,095 | A | * | 6/1994 | Vadnais et al. .................. 342/22 |
| 2004/0117964 | A1 | * | 6/2004 | Pichler .......................... 29/426.5 |
| 2007/0048090 | A1 | * | 3/2007 | Wentworth et al. ......... 405/184.1 |

FOREIGN PATENT DOCUMENTS

GB          736749          9/1955

* cited by examiner

*Primary Examiner* — Sean Andrish
(74) *Attorney, Agent, or Firm* — Michael Best & Friedrich LLP (57) ABSTRACT

The present invention provides an apparatus and method for recovering the core (108) of a subterranean sheathed electrical cable (106), while minimising the impact on the surrounding environment. The apparatus comprises a ram (102) operable to exert a pushing force on the core of a length of the cable, a plurality of linkages, each linkage being configured to be insertable into the cable along its length under the action of the ram to displace the core relative to an outer sheath of the cable, and a puller operable (104) to exert a pulling force on the core to thereby facilitate removal of the displaced core from the outer sheath by action of the pushing/pulling forces. The apparatus and method are found to be particularly suited to the recovery of high-tension copper core cables, while enabling any hydrocarbon (e.g. oil) impregnated inner sheathing to be controllably disposed of without hazard to the environment.

35 Claims, 8 Drawing Sheets

APPARATUS AND METHOD FOR RECOVERING THE CORE OF A SHEATHED ELECTRICAL CABLE

FIELD OF THE INVENTION

The present invention relates to the recycling of electrical power cables and particularly relates to an apparatus and method for recovering the cores of sheathed electrical cables, while avoiding environmental contamination.

BACKGROUND OF THE INVENTION

It has long been the practice in urban areas to distribute electrical power via sub-surface or subterranean high-voltage power cables. However, once these cables reach the ends of their operational lifetimes, or are otherwise de-commissioned, the cables are usually left in the ground by the utility companies. The reasons for this are generally due to the expense of excavating the cables and also to the potential disruption and delay caused to traffic in urban areas (e.g. city centres etc.). Since the cables typically run for hundreds of metres underground, the problem of removal is significant, as excavating channels of this length through urban areas, even if broken into shorter sections, is not generally practical and in any event is considerably time consuming.

Moreover, in addition to the potential expense and disruption, there are also environmental concerns relating to the removal of decommissioned cables. Virtually all high-voltage power cables contain a copper core as the electrical conductor. However, many of the older cables also contain an inner sheathing comprising an oil impregnated paper that is wrapped around the copper core, on top of which may be a layer of lead as well. The oil and paper serve as an insulator to the current carrying core, which is then enclosed by an outer sheathing, typically a thick rubber or plastic coating. Therefore, the oil and paper sheathing presents a significant hazard to the immediate environment in the vicinity of the cables, as any leakage of the oil (arising from the removal of the cables) can seep into the ground and may contaminate the local environment, while also possibly causing problems with nearby drainage and sewerage flow etc. Hence, it is certainly desirable to avoid any of the oil entering the environment.

SUMMARY OF THE INVENTION

However, it has been recognised that the recycling of the copper cores themselves may certainly be beneficial, as opposed to simply leaving these in the ground. Especially when one considers that power cables are generally laid in sets of three (due to operational requirements), and hence a significant quantity of copper may be recovered for recycling purposes given the relatively long lengths of these cables.

As mentioned above, the cables can be removed via conventional 'long-channel' or extended trench excavation techniques. However, such techniques are generally costly and may expose the environment to potential contamination from the oil impregnated sheathing (as earth moving equipment may rupture the cables). To address this problem, some attempts have been made to remove the copper cores in situ by forcing the copper and oil bearing paper through the cable. However, such techniques have typically suffered from the drawback that the paper undergoes compression (e.g. 'crumples up') and generally causes the core and mechanism to jam, with the result that removal becomes hindered, or otherwise impossible, while increasing the risk that possible leakage of the oil may occur (e.g. due to rupturing the outer sheathing).

Therefore, it is an object of the present invention to address some, if not all, of the above problems in the art, by providing an improved apparatus and method which allows reliable and consistent removal of the core for recycling purposes, while minimising or preventing environmental contamination to the ground surrounding the cable.

According to a first aspect of the present invention there is provided an apparatus for recovering the core of a sheathed electrical cable, comprising:
a ram operable to exert a pushing force on the core of a length of the cable;
a plurality of linkages, each linkage being configured to be insertable into the cable along its length under the action of the ram to displace the core relative to an outer sheath of the cable; and
a puller operable to exert a pulling force on the core to thereby facilitate removal of the displaced core from the outer sheath by action of the pushing/pulling forces.

The provision of a ram that is operable to exert a pushing force on the core of a length of the cable, in conjunction with a puller that is operable to exert a pulling force on the core, is found to be particularly advantageous as the combined effect of the pushing/pulling forces allows the core to be relatively easily removed relative to the outer sheath, while preventing jamming of the core and the ram operated linkages.

By "core" we mean the interior components of the cable, excluding any (electrically insulating) outer sheath (e.g. coating or layer etc.). Hence, it is intended herein for references to the "core" to include, for example, both the internal electrical conductor (e.g. copper conductor) and any adjacent overlying, internal insulating layer or layers, particularly hydrocarbon impregnated materials, such as oil bearing papers, or lead etc. However, it is to be appreciated that the core may comprise any type of electrical conductor(s) and, optionally any type of overlying insulating layer(s), while still benefitting from the advantages of the present invention.

Preferably, the ram and the puller are separate devices, which are preferably deployed at first and second locations, which are spaced by a predetermined length of the cable. By "predetermined length of the cable" we mean the finite length of the cable that has been selected for processing, with a view to recovery of the copper core. The apparatus may have an 'operational range' of between about 80 m to about 400 m, or in other words, the cable may be processed in lengths anywhere within this range. More preferably, the cable may be processed in lengths between about 80 m to about 300 m, and most preferably, the cable may be processed in lengths of about 100 m. Hence, the ram and the puller may be spaced apart accordingly.

However, it is to be understood that any suitable length of cable may be processed depending on the particular type of cable and the subterranean path followed by the cable. In particular, where the cable is especially curved or otherwise follows a non-linear path, shorter lengths may need be processed to follow the contour of the cable and/or the ground etc. Conversely, where conditions permit, a long linear cable may be processed in a greater length if needed, to simplify the recovery procedure and/or possibly shorten the overall time required for the removal of the core.

As will be explained in greater detail below, the first and second locations preferably relate to the localised sites at which the subterranean cable is excavated and in which the ram and the puller are respectively deployed and installed. Hence, it is be understood that the first and second locations may generally relate to 'pit-like' volumes in the ground at which the 'ends' of the cable to be processed are located. Of course, it should be appreciated that in most cases the cables are continuous and hence by 'end' we mean that section of the cable that resides within the excavated pit-like volume.

Thus, it should be appreciated that the present invention is able to effect removal of the cores without the need for long-channel or extended trench excavation. Consequently, the present invention minimises or otherwise eliminates disruption to traffic and pedestrianised routes within urban areas, while potentially lower the costs of the core removal, and as such has significant advantageous over conventional cable recovery techniques.

The ram is preferably a hydraulic ram that is capable of exerting a pushing force on the core by way of a hydraulically activated mechanism. The physical size of the ram may be determined by the length and/or thickness of the cable that is to be processed. In some embodiments, the ram may weigh between about 350 kg to about 450 kg, depending on the particular application.

Preferably, the ram is configured to exert a pushing force (i.e. thrust) in the range from about 275 kN to about 1760 kN, and is most preferably configured to exert a pushing force of about 400 kN.

In preferred embodiments, the puller is structurally and mechanically identical to the ram, except that the puller is configured to exert a pulling force on the core, as opposed to the pushing force of the ram. Therefore, in some embodiments the puller may have the same size and weight as the ram, and also may be hydraulically activated.

Preferably, the puller is configured to exert a pulling force in the range from about 400 kN to about 2550 kN, and is most preferably configured to exert a pulling force of about 700 kN.

Of course, as will be appreciated, any suitable thrust or pulling force may be exerted by the core recovery apparatus of the present invention depending on the particular cable or recovery conditions. Moreover, although it is preferred that the ram and puller may be mechanically similar in form and structure, they may alternatively be different types of device in other embodiments. Hence, it is within the scope of the invention that at least one of the ram and the puller may be electrically driven or pneumatically driven, or by any combination of hydraulic, electric or pneumatic mechanisms. Also, the ram and the puller may be driven differently, such that one is electric and one is pneumatic etc.

However, in the most preferred embodiments, both the ram and the puller are hydraulic in nature. Preferably, the ram and the puller are each operated by a diesel hydraulic unit, which may have a power output in the range of about 25 hp to about 40 hp, and is most preferably about 29 hp.

In preferred embodiments, the ram and the puller each comprise a gripping mechanism, to respectively grip a linkage and the copper core of the cable. The gripping mechanism is most preferably in the form of a pair of gripping jaws.

Preferably, each jaw includes a recessed channel or groove on its leading edge, which is adapted to receive either the core or a linkage in gripping engagement.

The function of the jaws on the ram are to grip and push on the linkage as it is inserted into the cable; while the function of the jaws on the puller are to pull on the core to facilitate removal of the displaced core from the outer sheath of the cable.

Although the jaws may take any suitable shape or form, in preferred embodiments, each jaw is preferably approximately shaped like an "axe-head", having a narrow end in which a mounting hole may be disposed and a larger end which may bear the groove on its leading edge. The mounting holes preferably enable the jaws to be attached to the hydraulic mechanism of the ram and the puller. The gripping surfaces presented by the grooves each engage with either a linkage or the copper core, which when the jaws are acted upon by the ram or the puller, enable them to move together to push the linkage or pull the core between them.

The mounting holes in the jaw are preferably 'eccentrically located' relative to the centre of the jaw (i.e. are positioned slightly off-centre). The reason for this is to impart a cam action to the jaws, by virtue of the off-centred mounting holes and shape of the jaws, so that when force is applied by the hydraulic ram/puller, the jaws grip the linkage or cable with greater force, than would otherwise be achieved. As a result, the cam action minimises, or otherwise prevents, the linkage or core from slipping through the jaws as the ram or puller exert their respective pushing/pulling forces.

The ram exerts a pushing force on the core of the cable by way of the plurality of linkages, which are preferably inserted into an exposed end of a length of the cable (as discussed in more detail below). As discussed above, the length of the cable will be determined by the length which has been selected for processing.

The first linkage to be inserted into the end of the cable preferably comprises a core locating member for engaging with the copper core. The core locating member may be in the form of an end fitting at the leading tip of the linkage (i.e. the tip that is inserted into the cable). The fitting is configured to engage with the circular cross-section of the copper core, and is preferably intended to maintain the relative co-axial relationship between the core and the linkage, to thereby prevent the end of the linkage from drifting to one side or another, as the linkage is inserted further into the cable and/or as the cable bends to follow a non-linear path. Hence, the use of a core locating member is particularly advantageous, as it allows the linkages to track the contour of the cable, irrespective of any sub-surface undulations or cable curvature.

Preferably, each linkage is in the form of a substantially rigid push rod, which may be fabricated from steel or other suitable alloy. Although the push rods may be relatively rigid, they may also preferably retain at least some degree of flexibility to enable them to traverse 'gently curved' sections of the cable. Hence, it is to be understood that the rigidity/flexibility of the push rods may be selected dependent on the particular type and/or curvature of cable that is being processed, and thus different types of push rod may be used for different applications.

The push rods may be connected together by way of a reciprocating screw thread, or alternatively by another suitable locking mechanism, for example, a bayonet-type 'twist and lock' mechanism. However, it is be appreciated that any suitable connection and connector type may be used in conjunction with the linkages of the present invention.

The push rods may each be about 950 mm in length and may weigh between about 5 kg to about 10 kg, and most preferably weigh about 8 kg.

As each successive push rod is connected to the preceding rod, it is then inserted into the cable. Therefore, in some embodiments, it is envisaged that the operating length of the plurality of connected push rods may extend linearly over a range of between about 80 m to about 400 m, depending on the length of the cable that is being processed.

The apparatus preferably further comprises at least one respective clamping unit associated with each of the ram and the puller, and most preferably comprises two clamping units for each of the ram and the puller. The function of the clamping units is to grip and secure the outer sheath of the cable at the exposed ends of the cable (as discussed in greater detail below), so as to maintain the position of the outer sheath relative to both the ram and the puller during removal of the core. In addition it is found that by essentially 'immobilising' the outer sheath in this way, it is easier to ensure that the push rods to be inserted 'run true' (i.e. are co-axial with) the cable.

Preferably, the clamping unit includes a restraint collar adapted to engage with and grip the outer sheath of the cable to prevent displacement of the sheath during processing of the cable. The restraint collar may be in the form of a clamping ring, which preferably comprises two semi-circular components that may be securely bolted together around the outer sheath of the cable. However, it is to be appreciated that the clamping unit and/or the restraint collar may have any suitable shape and/or have any configuration depending on the size and/or type of cable that is to be processed. Moreover, any number of clamping units may be used with both the ram and the puller.

In preferred embodiments, the ram and the puller each further comprise a support frame for adjustably supporting the one or more clamping units. Preferably, the support frame may include at least a pair of guide rails onto which the clamping units can be adjustably mounted so that their position along the length of the outer sheath can be varied to optimise the location at which the cable is clamped. In particularly preferred embodiments, the support frame comprises two pairs of guide rails, preferably one above the other in parallel formation, to form a skeleton frame that preferably extends away from the body of the ram and the puller, respectively. However, any other suitable form of support frame may be used in conjunction with the present invention.

As mentioned above, there may be any number of clamping units associated with either the ram or the puller, but most preferably there are two clamping units mounted to the guide rails, each of which can be adjustably spaced relative to the other and to the outer sheath of the cable.

The core recovery apparatus of the present invention may further comprise one or more containers or drip trays to prevent spillage of contaminants, such as oil, during removal of the core from the cable. Preferably, a drip tray is provided at each of the first and second locations, and hence a tray may be installed at the base, or close to the bottom, of each pit-like volume. Therefore, as the core is removed, any oil bearing paper, and liquid oil, can be trapped in the tray for safe removal and disposal, without contaminating the surrounding ground.

In addition to the evident recycling and environmental benefits of the present invention, the described apparatus also provides another significant advantage in that the recovery process leaves behind a vacant duct or conduit. Hence, since the outer sheath is allowed to remain in the ground, relatively undisturbed, it may be reused as an empty ducting by other utility companies, such as telecoms and cable media suppliers etc. Thus, in addition to recovering the copper core for recycling, the present invention also provides the opportunity for new cabling to be laid without the need to excavate channels, which obviously lowers costs and avoids any disruption to traffic and pedestrians, particularly within urban areas etc.

It is possible to increase the diametrical size of the duct by making use of conventional pipe bursting techniques, which generally employ a roller blade that can be drawn through the existing duct to expand the size of the existing duct. Hence, the present apparatus may therefore be adapted in some embodiments to pull a roller blade attached to a push rod through the duct, followed by an expander cone and support rod. A new ducting (of larger diameter) may then be drawn into the void created by the burst casing of the existing duct (as explained in greater detail below).

According to a second aspect of the present invention there is provided a method for recovering the core of a sheathed electrical cable, comprising:
 exerting a pushing force on the core of a length of the cable, the pushing force being provided by a ram;
 inserting a plurality of linkages into the cable along its length under the action of the ram and displacing the core relative to an outer sheath of the cable;
 exerting a pulling force on the core by way of a puller; and
 removing the displaced core from the outer sheath by action of the pushing/pulling forces.

The step of exerting a pushing force on the core of a length of the cable, in conjunction with the step of exerting a pulling force on the core, is found to be particularly advantageous as the combined effect of the pushing/pulling forces allows the core to be relatively easily removed relative to the outer sheath, while preventing jamming of the core and the ram operated linkages.

Preferably, the ram and the puller are separate devices, which are preferably deployed at first and second locations, as discussed above in relation to embodiments of the first aspect of the invention. Hence, the pulling force is preferably exerted on the opposite end of the core to that of the pushing force.

None of the existing prior art techniques have previously utilised a recovery method which harnesses both thrust and pulling forces to extract the copper cores of sheathed electrical cables, and hence the present invention provides a reliable technique by which the copper cores and oil bearing paper may be recovered without contaminating the surrounding environment.

As discussed above in relation to the first aspect of the invention, the method of recovering the cores of subterranean cables will, in some embodiments, preferably involve the step of excavating respective 'pit-like' volumes at first and second locations along the length of the cable. Each of these pit-like volumes are preferably sized so as to accommodate a respective one of the ram and the puller. In this way, two sections of the cable may then be exposed in preparation for recovery of the core.

The length of the cable to be processed will depend on the local terrain, the path of the cable and/or practical considerations relating to traffic flow and pedestrian access etc. However, in preferred embodiments, it is envisaged that the cable may be processed in lengths within the range of about 80 m to about 400 m, and most preferably in a length of about 100 m.

The present method may also comprise initially locating the cable using a ground penetrating radar. However, it is to be appreciated that any other suitable cable locating technique may be used in conjunction with the present invention. In addition, in some instances an a priori knowledge of the cable route may already be known, and therefore an initial locating step may not be required.

Once the cable is located, it may also be preferably tested to confirm that is no longer current bearing. Any suitable current detection device may be used for this purpose, but an inductive-based detector is most preferable.

Preferably, a container or drip tray may also be installed at the base, or close to the bottom, of each of the pit-like volumes. An advantage of this is that the oil bearing paper, liquid oil or other contaminants may be trapped and collected in the tray without coming into contact with the ground. Hence, the use of the trays minimise or otherwise eliminate the risk of any environmental contamination.

To commence recovery of the core, a relatively short section of the cable is preferably removed in each of the pit-like volumes at the first and second locations. Any suitable cutting device may be used to remove the sections of cable, and in preferred embodiments this is achieved by way of a reciprocating saw.

The cut end of the cable in the 'pit-like' volume accommodating the puller, is preferably prepared by stripping the outer sheath from the cable, so that the jaws of the puller may be grippingly engaged with the copper core (as discussed above in relation to embodiments of the first aspect of the invention).

Preferably, the outer sheath is clamped at at least one of the ram and the puller, to prevent displacement of the sheath relative to the ram or puller. In preferred embodiments, the outer sheath is clamped at two locations at each of the ram and the puller to ensure that the linkages to be inserted 'run true' (i.e. are co-axial with) the cable.

The clamping may include engaging a restraint collar with the outer sheath of the cable to prevent displacement of the sheath during removal of the core.

Preferably, the step of inserting the plurality of linkages involves the step of inserting successive linkages, one after another, into the cut end of the cable in the pit-like volume hosting the ram. The linkages are inserted under the action of the ram. In this way, the linkages begin to displace the core relative to the outer sheath, which facilitates removal of the core at the opposite end to that of the ram.

Preferably, a core locating member attached to the first linkage to be inserted into the cable is engaged with the copper core. An advantage of using a core locating member is that the relative co-axial relationship between the core and the linkage may be maintained, to thereby prevent the end of the linkage from drifting to one side or another, as the linkage is inserted further into the cable and/or as the cable bends to follow a non-linear path.

The step of inserting the plurality of linkages preferably comprises gripping each successive linkage in at least one pair of movable gripping jaws associated with the ram, as discussed in relation to embodiments of the first aspect of the invention.

The displaced core may be removed by repeatedly gripping and pulling the core by way of the jaws associated with the puller, until all of the core has been pulled through the cable relative to the outer sheath. At this stage, the copper core may be recovered for recycling purposes, while the oil bearing paper can be safely removed for appropriate environmentally-friendly disposal.

Since the core is removed by both pushing and pulling the core, the oil bearing paper does not jam the linkages during the recovery process, and hence the core may be reliably recovered without risk of damaging the apparatus or contaminating the environment.

The step of exerting the pushing force on the core may involve exerting a force in the range of about 275 kN to about 1760 kN, and is most preferably about 400 kN.

Whereas, the step of exerting the pulling force on the core may involve exerting a force in the range of about 400 kN to about 2550 kN, and is most preferably 770 kN.

The outer sheath may be reused as an empty ducting or conduit by other utility companies, such as telecoms and cable media suppliers etc. Thus, the diametrical size of the duct may be enlarged by making use of conventional pipe bursting techniques. Therefore, a roller blade may be drawn through the existing duct to expand the size of the duct. In one embodiment, a roller blade attached to a push rod may be drawn through the duct, followed by an expander cone and support rod. A new ducting (of larger diameter) may then be drawn into the void created by the burst casing of the existing duct.

Hence, in addition to recovering the copper core for recycling, the method of the present invention also provides the opportunity for new cabling to be laid without the need to excavate channels, which obviously lowers costs and avoids any disruption to traffic and pedestrians, particularly within urban areas etc.

The duct may also be internally cleaned, preferably by way of a steam or high pressure water-based cleaning device etc., after removal of the core.

BRIEF DESCRIPTION OF THE DRAWINGS

Embodiments of the present invention will now be described in detail by way of example and with reference to the accompanying drawings in which.

"DETAILED DESCRIPTION

Figure 1:
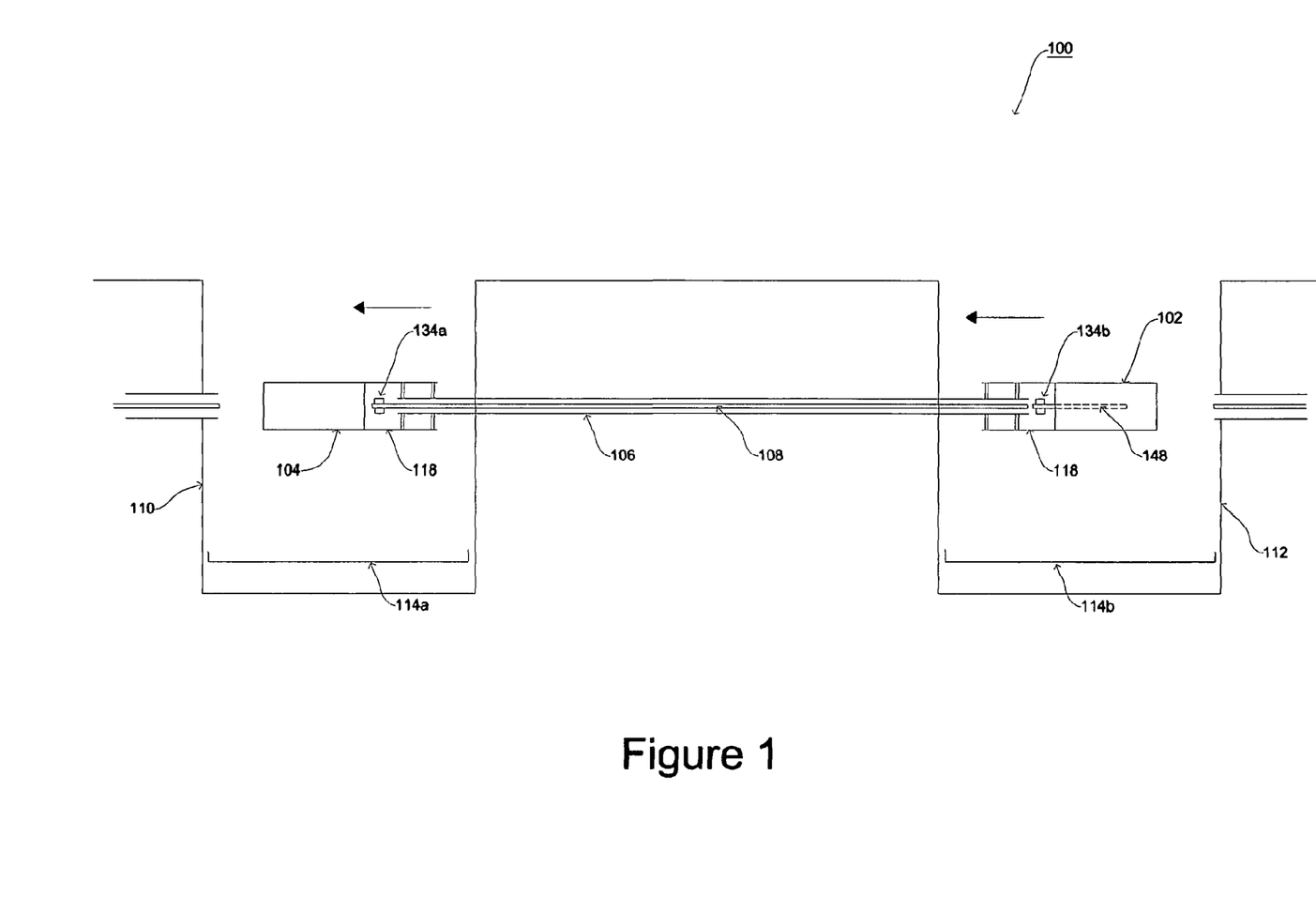
FIG. 1—shows a schematic view of a core recovery apparatus, depicted when in use, according to a preferred embodiment of the present invention.

Referring to FIG. 1, there is shown a particularly preferred embodiment of a core recovery apparatus 100 according to the present invention. It is to be understood that the apparatus as shown in FIG. 1 is not drawn to scale and therefore the figure is intended for illustrative purposes only.

Figure 4:
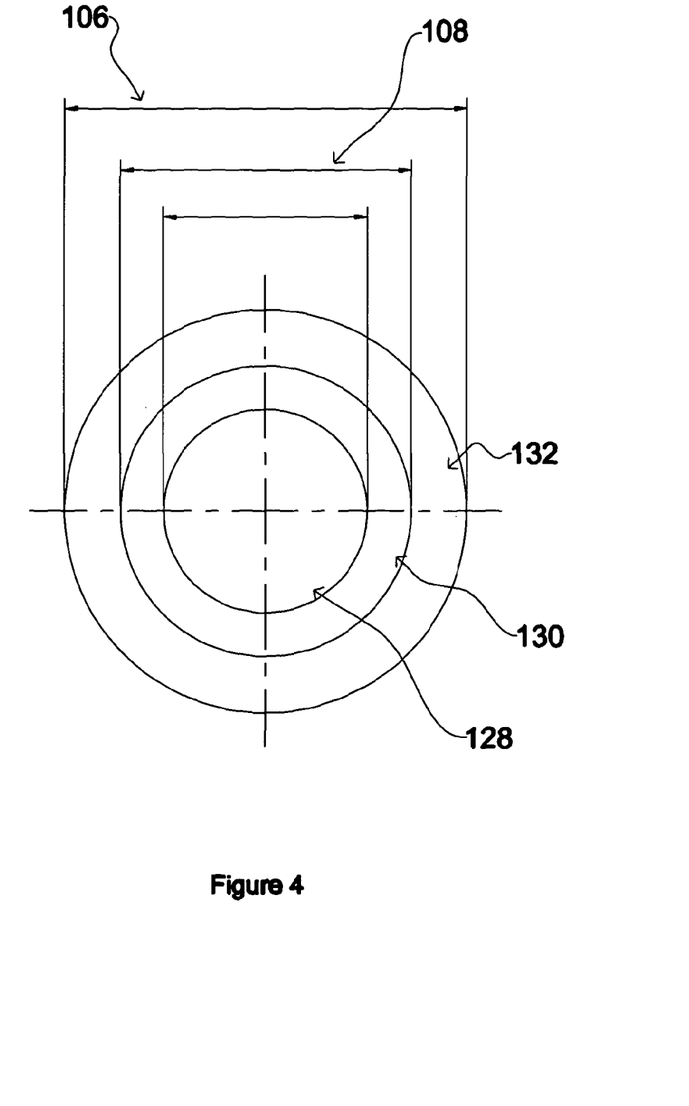
FIG. 4—shows a schematic representation of the layered components of an example sheathed electrical cable as known in the prior art.

The apparatus 100 comprises a hydraulic ram 102 and a hydraulic puller 104, which are disposed at first and second locations that are spaced apart along a length of a subterranean cable 106 that is to be processed. The cable 106, in this example, is a decommissioned high-tension electrical power cable of a type having a core 108 comprising an inner copper conductor 128, surrounded by an insulating layer of an oil impregnated paper 130 (as shown in FIG. 4). Cables of this type are generally of older design, and therefore have now come to the ends of their operational lifetimes. In some cases, the cables may also contain an internal, non-ferrous lead sheathing, which may overlay the oil bearing paper. An outer sheath of hardened rubber or plastic normally completes the cable and provides good insulation between the current carrying copper core and the surrounding ground.

It should be noted that high-tension electrical cables are conventionally laid in sets of three, for operational reasons. However, for clarity only one cable is depicted in FIG. 1, which is not intended to be limiting. Thus, the present invention may be used in conjunction with any number of multiply laid cables, or just one, without sacrificing any of the benefits of the present invention.

It is to be appreciated that the oil bearing paper 130 may pose a significant environmental hazard if the oil is allowed to enter into the local environment during the recovery process, and therefore it is highly desirable to avoid contamination of the ground surrounding the cable.

To process a cable, its underground path or route must first be accurately determined. Reference may be made to any existing maps (e.g. as drawn at the time of installation), which may show the path of the cable relative to one or more above- or below-ground surface features (e.g. manhole covers or sewerage pipes etc.), or more usually this is determined by way of a ground penetrating radar. In the present invention, the step of locating the cable 106 is ideally carried out using a ground radar rig of a type such as that manufactured by Italian company, IDS (Ingegneria dei Sistemi S.p.A). However, any other suitable cable locating device may alternatively, or additionally, be used.

It should be appreciated that in many cases, the path of the cables are not accurately known, and therefore cable detection is usually required before the recovery process can commence.

Referring again to FIG. 1, it is shown that once the cable 106 has been located, respective 'pit-like' volumes 110, 112 are excavated at the first and second locations. The spacing of the pits 110, 112 is determined by the length of the cable that has been selected for processing, but it is envisaged that the cables will be processed in lengths of between about 80 m to about 400 m, and ideally in lengths of 100 m. Of course, the length of the cable to be processed will depend largely on the path of the cable and/or whether or not the path is decidedly non-linear. Hence, shorter lengths may need to be processed depending on any curvature of the cable and/or the structure of the surrounding terrain. In addition, above-ground (immovable) surface features (e.g. buildings, trees, road layouts etc.) may also, in practice, dictate the length, and the number of lengths, in which the cable has to be processed.

The pits 110, 112 are excavated using a suction excavation technique, which does not disturb the integrity of the cable 106. Hence, unlike some earth-moving excavation techniques (as used in extended trench excavation), the suction excavation has little, or no risk of rupturing the outer sheath of the cable and allowing contaminants to enter into the ground. The pits 110, 112 are dimensioned to respectively accommodate the ram 104 and the puller 112, and as such can have any suitable depth and volume. However, a notable advantage of the present process is that it avoids the need for extended trench excavation, as only two localised pits are required in order to install the core recovery apparatus 100. Hence, localised pit excavation has only minimal effect on traffic and pedestrian flow and as such the present process is ideally suited for core recovery in urban areas and city centres etc.

Once the cable 106 has been exposed in both of the pits 110, 112, a safety test is carried out to confirm that the cable is no longer current carrying. This test is most ideally performed by way of an inductive-based detector (not shown).

As shown in FIG. 1, the apparatus 100 further comprises drip trays 114a, 114b each of which is disposed in a respective one of the pits 110, 112. The drip trays 114a, 114b are generally rectangular in form and are operable to catch and trap any spillage or dripping of the oil from the cable 106 during the recovery process. In this way, the trays 114a, 114b prevent any of the oil from seeping into the ground and contaminating the environment. In addition, the tray 114a provides an ideal collecting 'trough' for the oil bearing paper 130 as it is removed from the cable 106. The oil bearing paper 130 may then be safely removed from the pit 110 after the core recovery process is completed.

To recover the core 108 of the cable 106, respective sections of the exposed cable are removed from the cable in each of the pits 110, 112. The sections are removed by cutting the cable 106 using a saw, such as a reciprocating saw. In pit 110, the cut end of the cable 106 then has its outer sheath stripped-back (e.g. the rubber coating and lead layer, if present) by approximately 2 metres to expose an end portion of the core. The removed sections, and stripped layers (e.g. oil bearing paper and lead) can then be taken away for safe disposal.

As shown in FIG. 1, the hydraulic ram 102 and the hydraulic puller 104 may then be installed at either end of the (now cut) length of the cable 106, such that the ends of the cable can now be secured to the puller 102 and the ram 104, respectively.

Figure 2A:
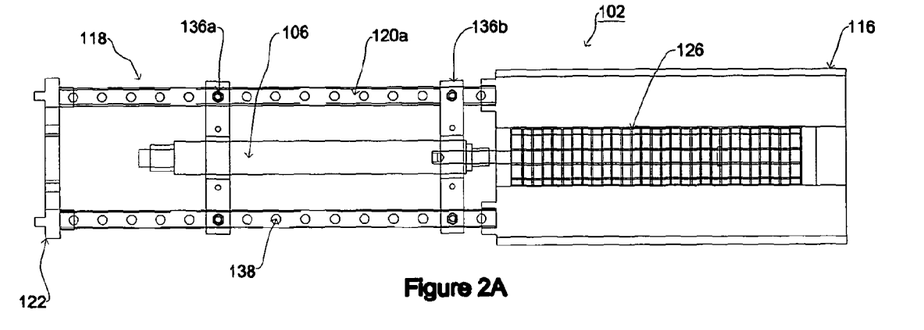
FIG. 2A—shows a plan view of a ram according to a particularly preferred embodiment of the present invention.
Figure 2B:
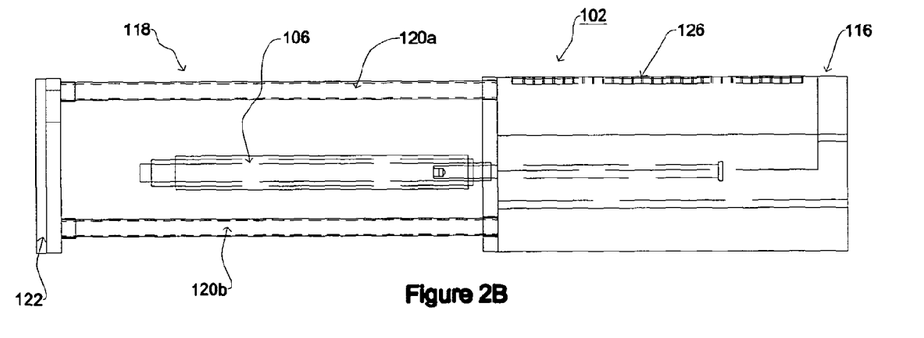
FIGS. 2B & 2C—show respective bottom and front views of the ram of FIG. 2A.
Figure 2C:
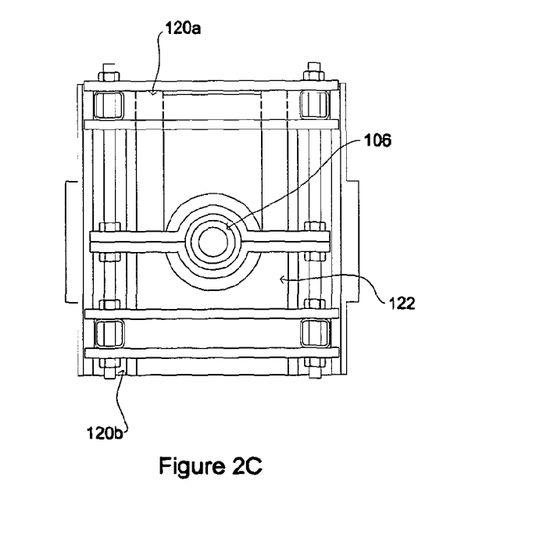

Referring now to FIGS. 2A to 2C, there is shown an example of a hydraulic ram 102 according to the present invention. The physical size of the ram 102, and/or its power output are dependent on the length of the cable that is to be processed. Hence, it is to be understood that larger or smaller versions of the ram may be used depending on the particular recovery conditions and type of cable that is to be recycled. In the example of FIGS. 2A to 2C, the ram 102 weighs 380 kg and is able to exert a pushing force (i.e. thrust) within the range of about 275 kN to about 1760 kN.

The ram 102 comprises a hydraulic mechanism housed in the aft section 116 of the body of the ram. The hydraulic mechanism is of a conventional type, which is able to operate a pair of gripping jaws, as discussed in more detail below in relation to FIGS. 7 and 8. The ram 102 further comprises a skeletal support frame 118, which includes a top pair of guide rails 120a and a bottom pair of guide rails 120b, spaced apart, and securely attached to the aft section 116 (as better shown in FIG. 3A).

Figure 3A:
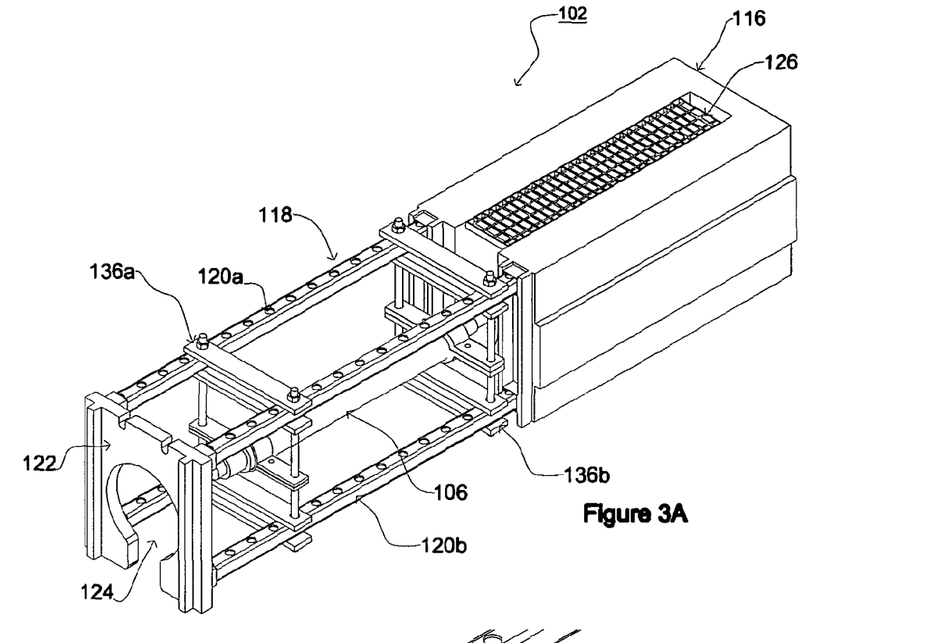
FIG. 3A—shows a perspective view of the ram of FIG. 2A.
Figure 3B:
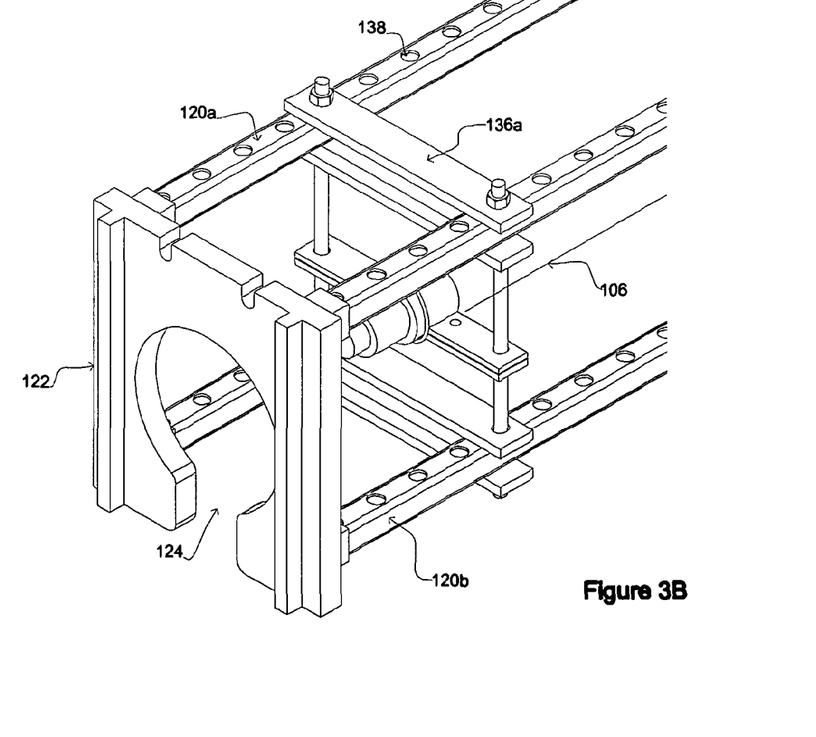
FIG. 3B—shows a magnified view of part of the end portion of the ram of FIG. 2A.

At the opposite end of the support frame 118 (i.e. to that of the aft section 116) is a plate 122, comprising an aperture 124 shaped substantially like that of a 'key-hole' open at its lower edge (see FIGS. 3A and 3B). The function of the plate 122 is to provide structural support and rigidity to the frame 118, while the aperture 124 permits the end of the cable 106 to be inserted into the ram 102 towards the aft section 116.

It is to be appreciated that although FIGS. 2A to 2C, and FIGS. 3A and 3B, relate to an example form of the ram 102 for use with the present invention. They may also be used to illustrate the structure and form of the puller 104. Therefore, in some arrangements the ram 102 and the puller 104 may be identical in physical and structural configuration, except that the puller has a hydraulic mechanism that is configured to exert a pulling force on the core of the cable 106, as opposed to the thrust exerted by the ram 102.

Hence, the puller 104 may exert a pulling force in the range of about 400 kN to about 2550 kN, and ideally exerts a pulling force of about 770 kN.

The power source for both the ram 102 and the puller 104 is a diesel powered hydraulic unit having a power output of about 29 hp. This unit may be integral to the aft section 116 of the ram 102 and the puller 104, or may be a separate device connected to the ram and the puller.

The ram 102 and the puller 104 each comprise a pair of gripping jaws (shown in FIG. 1 as 134b, 134a respectively). In pit 110, the copper core 128 is inserted into the puller 104, through the support frame 118, whereupon it is gripped by the hydraulically operated jaws 134a. The cable 106 is then secured at both ends in each of the pits 110, 112, by way of two respective clamping units 136a, 136b associated with both the ram 102 and the puller 104.

As best shown in FIGS. 2A and 3A, the clamping units 136a, 136b are adjustably supported by the frame 118. The function of the clamping units is to grip and secure the outer sheath 132 of the cable 106 at the cut ends of the cable, so as to maintain the position of the outer sheath 132 relative to both the ram 102 and the puller 104 during removal of the core 108. The frame 118 includes a plurality of spaced bolt holes 138 along the length of the guide rails 120a, 120b. The purpose of the bolt holes 138 is to allow the clamping units 136a, 136b to be moved and spaced relative to each other, and relative to the aft section 116 of the ram 102 and the puller 104. In this way, the best or optimum clamping position for the cable can be determined, and thus the cable may be secured so that the clamped section is substantially straight (which aids with the insertion of the linkages as discussed in detail below).

Figure 9A:
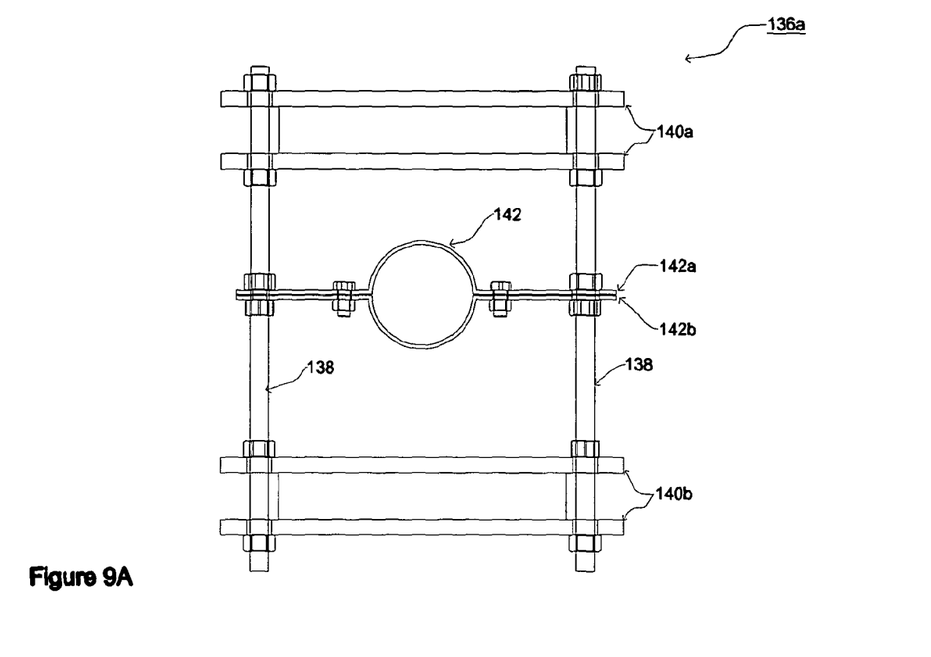
FIGS. 9A & 9B—show respective front and perspective views of a clamping unit according to a preferred embodiment of the present invention.
Figure 9B:
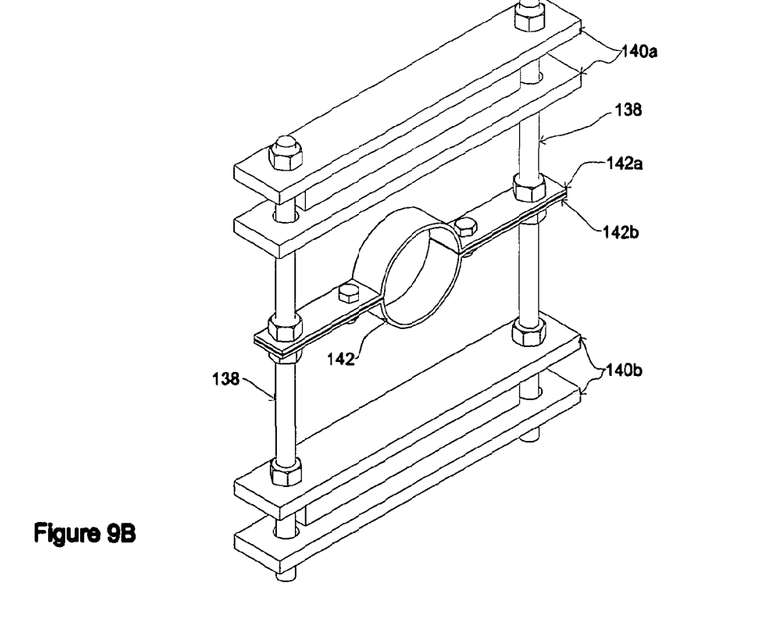
Figure 10A:
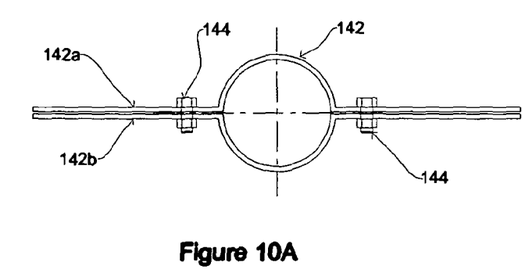
FIGS. 10A & 10B—show respective front and perspective views of a restraint collar, for use with the clamping unit of FIGS. 9A & 9B, according to a preferred embodiment of the present invention.
Figure 10B:
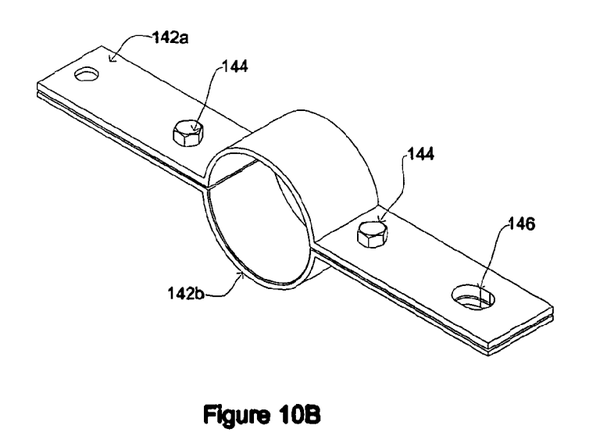

Referring now to FIGS. 9A and 9B, there is shown an example of a clamping unit for use with the apparatus of the present invention. The clamping unit 136a comprises two upright tubular sections 138, fabricated from a M24 grade 8.8 all thread screw, which support two pairs of elongate plate braces 140a, 140b that serve to clamp the unit 136a to respective ones of the guide rails 120a, 120b through the bolt holes 138 (see FIG. 3B). In the mid-portion of the clamping bracket 136a, there is a restraint collar that is adapted to engage with and grip the outer sheath 132 of the cable 106. As shown in FIGS. 10A and 10B, the restraint collar is in the form of a clamping ring 142, which comprises two semi-circular braces 142a, 142b that when secured together by way of M16 clamping bolts 144 grip the outer sheath 132 of the cable 106.

The braces 142a, 142b include slotted holes 146, as shown in FIG. 10B, that permit the clamping ring 142 to be laterally adjusted relative to the tubular sections 138, to thereby allow the optimum clamping position to be determined.

It is to be appreciated that the clamping units 136a and 138b are identical. Moreover, it should be understood that the clamping unit 136a and/or the restraint collar may have any suitable shape and/or have any configuration depending on the size and/or type of cable that is to be processed. Moreover, any number of clamping units may be used with both the ram and the puller.

In pit 112, after the outer sheath 132 has been clamped in position relative to the ram 102, a linkage 148 (shown as ghost lining in FIG. 1) is loaded into the ram 102 via the opening 126 (which is covered by a removable grill for safety purposes) as shown in FIG. 2A. The linkage is in the form of a steel push rod 148, which is about 950 mm in length and weighs about 8 kg.

Figures 5A, 5B:
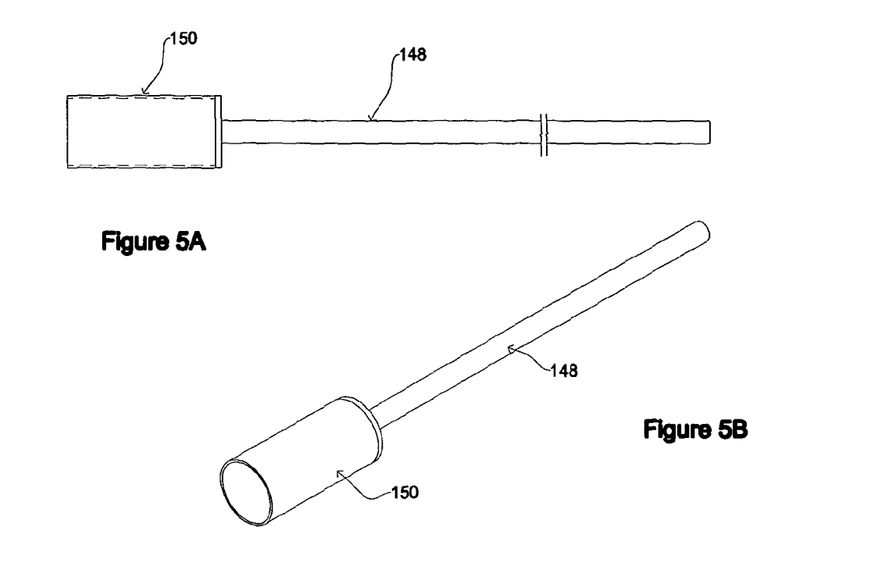
FIGS. 5A & 5B—show respective side and perspective views of a push rod according to a particularly preferred embodiment of the present invention.

The first linkage 148 to be inserted at the cut end of the cable in pit 112, comprises a core locating member 150, as shown in FIGS. 5A and 5B. The core locating member 150 is in the form of an end fitting, which comprises a hollow cylindrical tube, dimensioned to engage with and receive the copper core 128 of cable 106. The purpose of the core locating member 150 is to maintain the relative co-axial relationship between the core and the push rod 148, to thereby prevent the end of the linkage from drifting to one side or another, as the push rod 148 is inserted into the cable 106 and/or as the cable 106 bends to follow a non-linear path etc. Thus, the core locating member allows the linkages to track the contour of the cable, irrespective of any sub-surface undulations or cable curvature.

It can now also be further appreciated what role the clamping units 136a, 136b play in maintaining the straightness of the section of the cable that is clamped to the ram 102, as these permit the plurality of successively inserted push rods to 'run true' relative to the cable.

The apparatus comprises a plurality of push rods 148, with each successive push rod being connected to a preceding push rod, which is then inserted into the cable 106 under the action of the ram 102. Each push rod is therefore adapted for connection to a successive push rod 148, which is ideally achieved by way of a reciprocal screw thread (see FIGS. 6A to 6C).

Figure 6A:
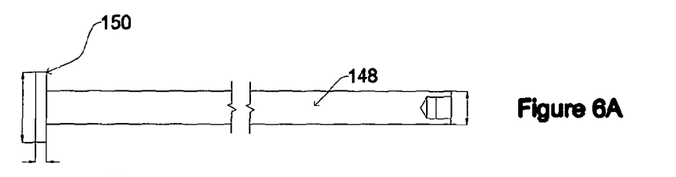
FIGS. 6A-6C—show alternate examples of push rods according to different embodiments of the invention for use with the ram.
Figure 6B:
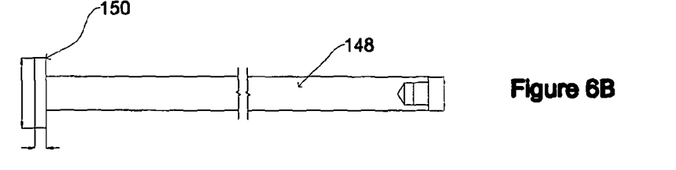
Figure 6C:
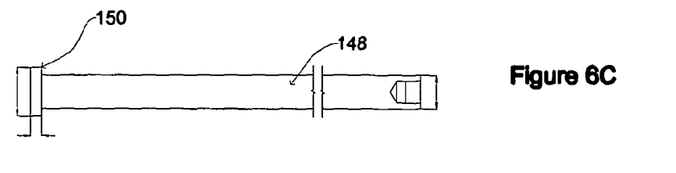

Referring now to FIGS. 6A to 6C, there are shown three different push rods each for use with different sizes of cable. Hence, it is to be understood that the diameter of the push rods 148 can be altered depending on the particular size or cable that is being processed. Moreover, as shown the core locating member 150 may instead be in the form of a flattened head or plate having a diametrical size relatively greater than that of the body of the push rod.

The 'operating length' of the push rods is, obviously, determined by the length of the cable that is to be processed and by the spacing of the ram and the puller. However, it is envisaged that the plurality of push rods will extend linearly over a range of between about 80 m to about 400 m, and in most cases will be about 100 m.

Once the first push rod 148 is loaded into the ram 102, the core recovery process may then commence. The operation of the ram 102 and the puller 104 is coordinated between at least two respective operators (not shown), one in, or associated with, each pit 110, 112. Some form of two-way radio communication is preferred. However, if the line of site between the pits 110, 112 is not obscured, operation may be achieved by way of visual indication (e.g. by signalling at each other).

A typical core recovery process initially commences by the operator in pit 110 actuating the puller 104, so that it starts to pull on the copper core 128 of the cable 108. At approximately the same time, or very shortly afterwards, the operator in pit 112 actuates the ram 102 and drives the first push rod 149 into the cable 106.

Figure 7:
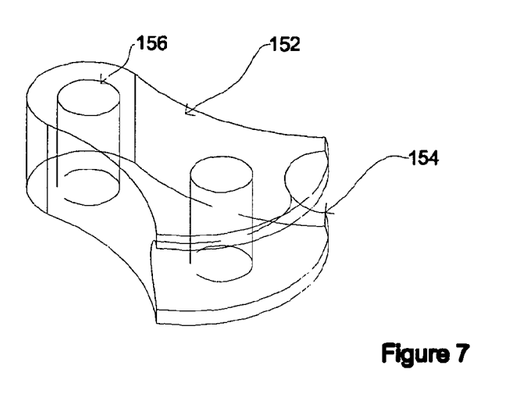
FIG. 7—shows a perspective view of an example jaw for use with the ram or puller according to a preferred embodiment of the present invention.
Figure 8:
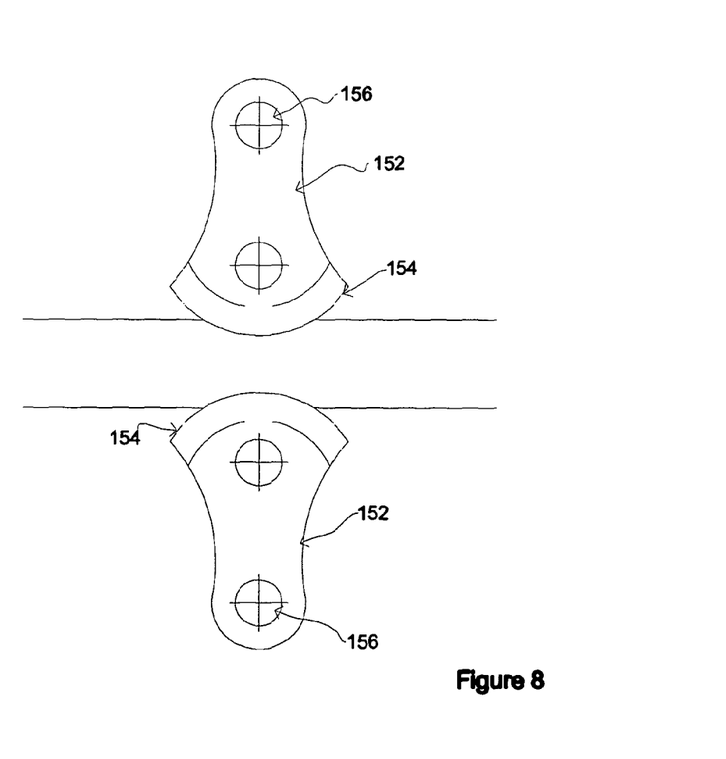
FIG. 8—shows a schematic view of a pair of jaws, depicted in use with either the ram or the puller, according to a particularly preferred embodiment of the present invention.

Referring now to FIGS. 7 and 8, each jaw 152 of the gripping jaws of the ram 102 and the puller 104, includes a recessed channel or groove 154 on its leading edge, which is adapted to receive either the core or a push rod in gripping engagement. The function of the jaws 152 on the ram 102 are to grip and push on the push rod 148 as it is inserted into the cable 106; while the function of the jaws 152 on the puller 104 are to pull on the copper core to facilitate removal of the displaced core from the outer sheath 132 of the cable.

As shown in FIGS. 7 and 8, each jaw is approximately shaped like an "axe-head", having a narrow end in which a mounting hole 156 is disposed and a larger end which bears the groove 154 on its leading edge. The mounting holes 156 enable the jaws to be attached to the hydraulic mechanism of the ram 102 and the puller 104. The gripping surfaces presented by the respective grooves 154 each engage with either a push rod or the copper core, which when the jaws 152 are actuated by the ram 102 or the puller 104, enable them to move together to push the push rod or pull the core between them.

The mounting holes 154 in the jaw 152 are preferably 'eccentrically located' relative to the centre of the jaw (i.e. are positioned slightly off-centre). The reason for this is to impart a cam action to the jaws 152, by virtue of the off-centred mounting holes 156 and shape of the jaws, so that when force is applied by the hydraulic ram/puller, the jaws grip the push rod 148 or copper core with greater force, than would otherwise be achieved. As a result, the cam action minimises, or otherwise prevents, the push rods 148 or copper core from slipping through the jaws 152 as the ram 102 or puller 104 exert their respective pushing/pulling forces.

Hence, as the ram 102 inserts the push rods into the cable 106, the core of the cable is displaced relative to the immobilised outer sheath 132, whereupon the copper core 128 and the oil bearing paper 130 emerge at the end of the cable in pit 110.

It is found that by using the combined effect of the pushing/pulling forces, the core can be relatively easily removed relative to the outer sheath, while preventing jamming of the core and the ram operated push rods.

As each push rod 148 is advanced into the cable 106, successive rods are repeatedly inserted until all of the core 108 is completely recovered. The copper core 128 may then be separated from the oil bearing paper 130, and recycled, while the waste materials can be disposed of according to environmentally-friendly disposal techniques.

The ram 102 may then be removed from the pit 112, which leaves the final push rod protruding from the end of the cable in pit 112. To prevent any contaminants from subsequently seeping into the environment after the recovery process is completed. The remaining outer sheath 132, now in the form of a hollow ducting or conduit, may then be cleaned within by way of a steam or other high pressure jet-based cleaning system. Therefore, any residual oil or contaminants can be flushed through the ducting.

Should the ducting be required for further use, such as by a telecoms or cable media supplier etc., new cabling can now be laid within the ducting, without the expense and/or inconvenience of excavating a new cable trench. Hence, the new cabling can then simply be passed through the ducting via conventional techniques, by making use of the existing pits 110, 112.

If there is a need to increase the diametrical size of the ducting, for example, so that it is able to carry a cable of a larger diameter etc., a duct roller blade and expander cone (not shown) can be attached to the last protruding push rod in pit 112. The new cabling may then be attached to this assembly, which may then be drawn through the ducting by the puller 104 in pit 110. As the puller 104 draws the blade and cone through the ducting, the outer sheath 132 is cut by the blade using a series of scribing wheels, which allows the expander cone to widen the duct and displace the ground surrounding the original cable. In this way, the new cable can then be deployed into the widened duct as the push rods are drawn through the outer sheath 132.

Once the blade and the cone emerge at the end of the duct in pit 110, the assembly can be dismantled and the puller 104 can be removed from the pit 110. Thereafter, pit 112 can be re-filled, while pit 110 can serve as the host for the ram 102 in order to process the next length of the cable and so on. This process is repeated until all the copper core is recovered, and optionally, until any new cabling has been laid.

Although the core recovery apparatus of the present invention is ideally suited for safely recycling the copper cores of decommissioned, subterranean high-tension power cables (of a type having oil-impregnated inner sheathing), it will be recognised that one or more of the principles of the invention may extend to other cable types and/or other cable recovery and recycling applications, whereby it is required to controllably remove the core of a relatively inaccessible cable without disturbing or damaging the outer sheathing, whether for re-use or to avoid environmental damage or contamination.

The above embodiments are described by way of example only. Many variations are possible without departing from the invention.

The invention claimed is:

1. An apparatus for recovering the core of a sheathed electrical cable, comprising:
    a ram operable to exert a pushing force on the core of a length of the cable;
    a plurality of linkages, each linkage being configured to be insertable into the cable along the length of the cable under the action of the ram to displace the core relative to an outer sheath of the cable; and
    a puller operable to exert a pulling force on the core to thereby facilitate removal of the displaced core from the outer sheath by action of the pushing and pulling forces.

2. The apparatus as claimed in claim 1, wherein the puller is configured to exert the pulling force on the end of the core opposite to the end of the core next to the ram.

3. The apparatus as claimed in claim 1, wherein at least one of the ram and the puller is hydraulic.

4. The apparatus as claimed in claim 1, wherein both the ram and the puller each comprise a pair of gripping jaws.

5. The apparatus as claimed in claim 4, wherein each jaw includes a groove adapted to receive one of the core and a linkage in gripping engagement.

6. The apparatus as claimed in claim 1, wherein a first linkage to be inserted into the cable comprises a core locating member for engaging with the core.

7. The apparatus as claimed in claim 1, wherein each linkage is in the form of a push rod.

8. The apparatus as claimed in claim 7, wherein each push rod is adapted for connection to another push rod.

9. The apparatus as claimed in claim 8, wherein the push rods are connected by way of a screw thread.

10. The apparatus as claimed in claim 1, wherein the plurality of linkages extend linearly over an operating range of between about 80 m to about 400 m.

11. The apparatus as claimed in claim 1, further comprising at least one respective clamping unit associated with each of the ram and the puller.

12. The apparatus as claimed in claim 11, wherein the at least one respective clamping unit includes a restraint collar adapted to engage with and grip the outer sheath of the cable to prevent displacement of the sheath during removal of the core.

13. The apparatus as claimed in claim 12, wherein the restraint collar is in the form of a clamping ring.

14. The apparatus as claimed in claim 1, wherein the ram further comprises a support frame for adjustably supporting the at least one respective clamping unit.

15. The apparatus as claimed in claim 14, wherein the support frame includes at least a pair of guide rails arranged to allow the position of the at least one respective clamping unit to be adjusted relative to the outer sheath of the cable.

16. The apparatus as claimed in claim 1, wherein the ram is arranged to exert a pushing force in the range from about 275 kN to about 1760 kN.

17. The apparatus as claimed in claim 1, wherein the puller is arranged to exert a pulling force in the range from about 400 kN to about 2550 kN.

18. The apparatus as claimed in claim 1, further comprising one or more drip trays to prevent spillage of contaminants during removal of the core from the cable.

19. A method for recovering the core of a sheathed electrical cable, comprising:

exerting a pushing force on the core of a length of the cable, the pushing force being provided by a ram;

inserting a plurality of linkages into the cable along the length of the cable under action of the ram and displacing the core relative to an outer sheath of the cable;

exerting a pulling force on the core by way of a puller; and removing the displaced core from the outer sheath by action of the pushing and pulling forces.

20. The method as claimed in claim 19, wherein the pulling force is exerted on the end of the core opposite to the end of the core on which the pushing force is exerted.

21. The method as claimed in claim 19, wherein inserting the plurality of linkages involves the step of inserting successive linkages one after another.

22. The method as claimed in claim 19, further comprising engaging the core with a core locating member attached to a first linkage to be inserted into the cable.

23. The method as claimed in claim 19, wherein inserting the plurality of linkages comprises gripping each successive linkage in at least one pair of movable gripping jaws associated with the ram.

24. The method as claimed in claim 19, wherein removing the displaced core comprises gripping the core in at least one pair of movable gripping jaws associated with the puller.

25. The method as claimed in claim 24, wherein the core is repeatedly gripped and pulled by the jaws to remove the displaced core from the cable.

26. The method as claimed in claim 19, further comprising clamping the outer sheath of the cable at at least one of the ram and the puller.

27. The method as claimed in claim 26, wherein clamping includes engaging a restraint collar with the outer sheath to prevent displacement of the sheath during removal of the core.

28. The method as claimed in claim 19, wherein exerting the pushing force involves exerting a force in the range of about 275 kN to about 1760 kN.

29. The method as claimed in claim 19, wherein exerting the pulling force involves exerting a force in the range of about 400 kN to about 2550 kN.

30. The method as claimed in claim 19, wherein the cable is subterranean and the method further comprises initially locating the cable using a ground penetrating radar.

31. The method as claimed in claim 19, wherein the cable is subterranean and the method further comprises excavating sections of the cable at first and second locations along the length, of the cable, prior to removal of the core.

32. The method as claimed in claim 31, wherein the step of excavating excavates a respective pit at the first and second locations in which to receive a respective one of the ram and the puller.

33. The method as claimed in claim 32, further comprising the step of installing a drip tray in each pit.

34. The method as claimed in claim 31, further comprising removing a relatively short section of the excavated sections of the cable at each of the first and second locations.

35. The method as claimed in claim 32, further comprising removing a relatively short section of the excavated sections of the cable at each of the first and second locations and further comprising stripping the outer sheath from a cut end of the cable in the pit accommodating the puller.

\* \* \* \* \*